United States Patent
Meier et al.

(10) Patent No.: US 8,973,883 B2
(45) Date of Patent: Mar. 10, 2015

(54) FASTENING APPARATUS FOR A BATTERY IN A MOTOR VEHICLE, AND MOTOR VEHICLE HAVING A FASTENING APPARATUS OF THIS TYPE

(75) Inventors: Steffen Meier, Freudental (DE); Volker Brunner, Weissach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 169 days.

(21) Appl. No.: 13/189,627

(22) Filed: Jul. 25, 2011

(65) Prior Publication Data

US 2012/0025045 A1 Feb. 2, 2012

(30) Foreign Application Priority Data

Jul. 28, 2010 (DE) .................. 10 2010 036 684

(51) Int. Cl.
*B60R 16/04* (2006.01)
*H01M 2/10* (2006.01)
*B60R 1/04* (2006.01)

(52) U.S. Cl.
CPC .............. *H01M 2/1083* (2013.01); *B60R 1/04* (2013.01); *B60R 16/04* (2013.01); *Y02E 60/12* (2013.01)
USPC ............................ 248/503; 248/505; 180/68.5

(58) Field of Classification Search
CPC .. Y02E 60/12; H01M 2/1083; H01M 2/1072; B60R 16/04; B60R 1/04
USPC ................ 248/500, 503, 505, 510, 689, 690, 248/229.16, 229.17, 229.26, 230.8, 544; 180/68.5; 24/301, 371; 280/769, 834; 224/902; 206/335
See application file for complete search history.

(56) References Cited

U.S. PATENT DOCUMENTS

| | | | | |
|---|---|---|---|---|
| 2,974,373 A | * | 3/1961 | Luxenberger et al. | 264/46.6 |
| 4,098,366 A | * | 7/1978 | Reinhard et al. | 180/68.5 |
| 4,367,572 A | * | 1/1983 | Zielenski | 24/301 |
| 4,508,794 A | * | 4/1985 | Wright | 429/96 |
| 4,936,409 A | * | 6/1990 | Nix et al. | 180/68.5 |
| 5,004,081 A | * | 4/1991 | Custer | 180/68.5 |
| 5,052,198 A | | 10/1991 | Watts | |
| 5,086,860 A | * | 2/1992 | Francis et al. | 180/68.5 |
| 5,222,711 A | * | 6/1993 | Bell | 248/503 |
| 5,484,667 A | | 1/1996 | Sahli et al. | |
| 5,823,502 A | | 10/1998 | Greiner et al. | |
| 6,102,356 A | * | 8/2000 | Huntley et al. | 248/500 |
| 6,230,834 B1 | * | 5/2001 | Van Hout et al. | 180/68.5 |
| 6,290,013 B1 | | 9/2001 | Bienenstein, Jr. | |
| 6,639,800 B1 | * | 10/2003 | Eyman et al. | 361/704 |
| 6,827,169 B1 | * | 12/2004 | Van Hout et al. | 180/68.5 |
| 2005/0224683 A1 | | 10/2005 | Hirayu | |
| 2008/0093236 A1 | | 4/2008 | Connelly et al. | |

FOREIGN PATENT DOCUMENTS

| | | |
|---|---|---|
| DE | 25 43 308 | 3/1977 |
| DE | 195 46 556 | 11/1996 |
| JP | 2004-362826 | 12/2004 |

* cited by examiner

*Primary Examiner* — Tan Le
(74) *Attorney, Agent, or Firm* — Gerald E. Hespos; Michael J. Porco; Matthew T. Hespos

(57) ABSTRACT

A fastening apparatus (1) for a battery (2) in a motor vehicle (29) has a carrier device (31) for carrying the battery (2). A clamping strap (10) encloses the battery (2) at least in sections and has opposite first and second end sections (11; 12). The first end section (11) is fastened to the carrier device (31). A clamping arrangement (17) is coupled to the second end section (12) of the clamping strap (10) and connects to the carrier device (31). An actuator (26) of the clamping arrangement (17) sets a prestress in the clamping strap (10).

11 Claims, 4 Drawing Sheets

FASTENING APPARATUS FOR A BATTERY IN A MOTOR VEHICLE, AND MOTOR VEHICLE HAVING A FASTENING APPARATUS OF THIS TYPE

CROSS REFERENCE TO RELATED APPLICATION

This application claims priority under 35 USC 119 to German Patent Application No. 10 2010 036 684.6 filed on Jul. 28, 2010, the entire disclosure of which is incorporated herein by reference.

BACKGROUND OF THE INVENTION

1. Field of the Invention

The invention relates to a fastening apparatus for a battery in a motor vehicle and to a motor vehicle having a fastening apparatus of this type. The invention can be applied to any desired vehicles but is described herein in relation to a passenger car.

2. Description of the Related Art

A motor vehicle usually has at least one battery. The battery serves, for example, to start an internal combustion engine of the motor vehicle by means of an electric motor and to store electrical energy. Furthermore, numerous further electric consumers are supplied by way of the battery, such as an air conditioning compressor or a fuel pump of the motor vehicle. To satisfy the requirements with regard to the outputting and the storage of electrical energy, the battery is configured as a rechargeable lead accumulator. The electrodes of a lead accumulator are formed from lead or of lead compounds and result in a high weight for the battery. This high weight can lead to the battery being ripped loose of its anchoring due to high mass forces acting on the battery in the case of a crash of the motor vehicle. A battery that is ripped loose can cause enormous damage solely on account of its high mass. Furthermore, sulfuric acid is used as electrolyte in the battery and can severely burn vehicle occupants if it escapes from the battery. Reliable fastening of the battery therefore is indispensable and the fastening of the battery must not be ripped out of the anchoring even in the case of a crash.

U.S. Pat. No. 6,102,356 describes a fastening apparatus for a battery in a vehicle, in which the battery is arranged in a trough-shaped battery carrier and the battery is fastened by means of a flexible but substantially inextensible lashing strap that encloses both the battery and the battery carrier. The lashing strap has a buckle so that the lashing strap can be closed around the battery and the battery carrier. However, the lashing strap disadvantageously cannot be loaded with a prestress, and releasing or at least loosening of the lashing strap can occur, for example, as a result of vibrations in an engine compartment of the vehicle. Thus, a safe fastening of the battery with respect to crashes is not ensured.

JP 2004362826 A describes a fastening apparatus for a battery having a battery carrier that encloses a base region of the battery and has a clamping means in the form of an extensible clamping belt. Metal eyelets are disposed at the ends of the clamping belt and are connected operatively to corresponding engagement sections on opposite side faces of the battery carrier. The extensible clamping belt is guided over an upper side of the battery and fixes the battery nonpositively in the battery carrier. The clamping belt is stretched during mounting and the metal eyelets are clipped into the engagement sections of the battery carrier. The clamping belt is formed from an extensible material that is under a prestress after mounting to ensure a reliable initial holding of the battery. However, this solution has proven disadvantageous in that the prestress generated in the clamping belt ultimately is determined only by the material properties of the clamping belt and therefore can decrease, for example, as a result of material fatigue or as a result of damage to the material, for example by contact with fuel. Furthermore, there is no assurance that the extensible clamping belt will hold the battery reliably in the desired position if subjected to very great mechanical loadings, for example, in the case of a crash of the vehicle. More particularly, a compromise has to be made in the design of the wall thickness of the clamping belt and the material used between simple mounting ability and achievable prestress in the clamping belt. Safe fastening of the battery with respect to crashes to facilitate initial mounting.

The invention therefore is based on the object of providing an improved fastening apparatus for a battery that does not have the abovementioned disadvantages.

SUMMARY OF THE INVENTION

The invention relates to a fastening apparatus for a battery in a motor vehicle. The fastening apparatus includes a carrier for carrying the battery, a clamping means and a clamping arrangement. The clamping means is for enclosing the battery at least in sections and is fastened with a first end section to the carrier device. The clamping arrangement is coupled to a second end section of the clamping means and has an actuating means for setting a prestress in the clamping means. The clamping arrangement connects the second end section of the clamping means to the carrier device.

The invention also relates to a motor vehicle having the above-described fastening apparatus.

The invention provides a clamping arrangement with an actuating means to set the prestress in the clamping means and to ensure reliable fastening of the battery, without the prestress in the clamping means being dependent on the material properties of the clamping means. Furthermore, the clamping arrangement can generate an almost unlimited prestress in the clamping means, with the prestress being limited only by the material properties of the clamping means and by the stability of the battery.

The carrier device has a battery carrier that preferably has a framework structure to provide a light and simple construction.

The carrier device preferably has a battery shell for receiving the battery. The battery shell preferably is arranged, in particular the battery carrier and the battery. As a result, the battery is protected against sliding before final fastening.

The battery shell preferably is an integral constituent part of the battery carrier to provide an inexpensive and weight-optimized production of the carrier device.

The first end section of the clamping means may be fastened nonpositively and/or positively, in particular screwed, to a first fastening point of the carrier device. As a result, reliable force transmission from the clamping means to the carrier device is ensured, and the reliability of the fastening apparatus is increased.

The clamping arrangement preferably has a clamping element that is coupled to the second end section of the clamping means. More particularly, the second end section may be sewn to the second end section of the clamping means to ensure a reliable coupling of the clamping means to the clamping arrangement.

The clamping element is configured so that an end face of the clamping element is spaced apart from the carrier device after setting a prestress in the clamping means. As a result, the maintenance of a sufficiently great prestress always is ensured.

The actuating means of the clamping arrangement preferably has an engagement section that is in nonpositive and/or positive engagement with a mating engagement section complementary to the engagement section of a second fastening point of the carrier device. The actuating means may be configured as a threaded screw and the second fastening point may be configured as a threaded hole. Thus, the fastening apparatus can be mounted simply and rapidly.

The clamping arrangement preferably has a spring element for maintaining the settable prestress in the clamping means. Thus, an embedding loss of the clamping means is compensated for reliably, thereby increasing the operational reliability of the fastening apparatus.

The clamping means may be configured as a flexible but substantially inextensible clamping strap, such as a clamping strap formed with a high strength woven plastic fabric. The material-induced flexibility and the low weight of the clamping strap result in particularly simple mounting of the clamping strap.

An eyelet or a belt end fitting may be sewn to the first end section of the clamping means for fastening to the carrier device. Thus, a high force transmission from the clamping means to the carrier device is ensured reliably.

The following text explains the invention in greater detail using exemplary embodiments with reference to the appended diagrammatic figures.

DETAILED DESCRIPTION OF THE PREFERRED EMBODIMENTS

Figure 1:
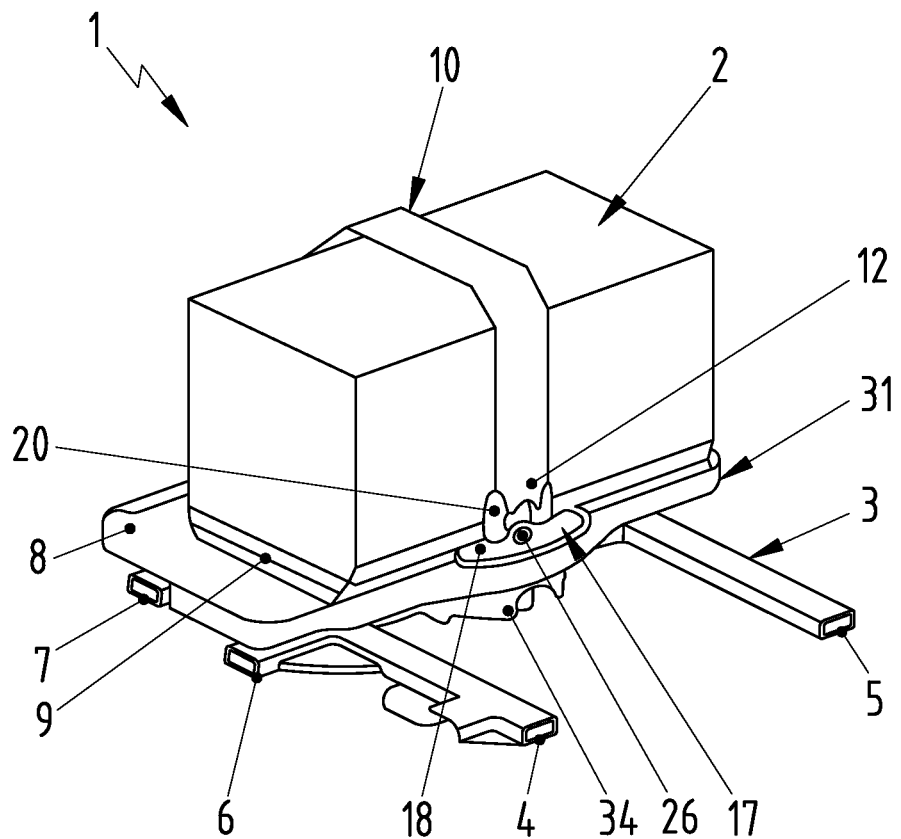
FIG. 1 is a three-dimensional view of one preferred embodiment of a fastening apparatus for a battery.
Figure 1:
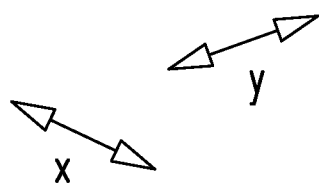

FIG. 1 illustrates a fastening apparatus 1 to fasten a battery 2 in a motor vehicle. The fastening apparatus 1 has a carrier device 31 for carrying the battery 2. The carrier device 31 has a battery carrier 3 that preferably is connected operatively to a load bearing structure of the motor vehicle. The battery carrier 3 defines a fame constructed, for example, from four rectangular carrier tubes 4 to 7 that are formed from a steel material. The carrier device 31 also preferably has a battery shell 8 arranged on the battery carrier 3 for receiving a base 9 of the battery 2. The battery shell 8 preferably is arranged between the battery 2 and the battery carrier 3. The battery shell 8 is formed, for example, from a steel sheet and is screwed, welded or connected in some other way to the battery carrier 3. The battery shell 8 protects the battery 2 from sliding in a transverse direction x and in a longitudinal direction y of the carrier device 31. To this end, the battery shell 8 engages at least sections around the base region 9 of the battery 2 and preferably defines an integral constituent part of the battery carrier 3.

The fastening apparatus 1 also has a clamping means 10 with first and second end sections 11 and 12. The clamping means 10 is a flexible substantially inextensible clamping strap that preferably is formed from a high strength woven plastic fabric such as polyester. Alternatively, the clamping means 10 may be a flexible metal belt, such as a flexible steel belt.

The carrier device 31 has a first fastening point 13, to which the first end section 11 of the clamping means 10 is fastened nonpositively or positively. The first fastening point 13 is provided, for example, on the lateral carrier tube 7 of the battery carrier 3 and preferably on a side face of the carrier tube 7 that faces away from the battery 2. The first fastening point 13 preferably is a threaded hole 13. Thus, the first end section 11 of the clamping means 10 can be screwed or riveted to the first fastening point 13 of the battery carrier 3 by a fastening means 33. An eyelet 14 is formed in the first end section 11 of the clamping means 10 or alternatively a belt end fitting is sewn to the first end section 11 for fastening the first end section 11 to the first fastening point 13 of the carrier device 31. The carrier device 31 also has a second fastening point 15 arranged on the carrier tube 6 or on a reinforcing strut 34 of the battery carrier 3. The second fastening point 15 has a mating engagement section 16 that preferably is a thread 16 of the threaded hole 15. The two fastening points 13, 15 of the carrier device 31 are spaced from one another in the transverse direction x, for example at a spacing from one another that corresponds approximately to a width of the battery 2 in the transverse direction x.

A clamping arrangement 17 is coupled to the second end section 12 of the clamping means 10 and connects the second end section 12 of the clamping means 10 to the carrier device 31 for nonpositively fixing the battery 2 on the carrier device 31 with a prestress that is set in the clamping means 10 by the clamping arrangement 17.

The clamping arrangement 17 preferably has a clamping element 18 which is connected fixedly to the second end section 12 of the clamping means 10, for example, by sewing. The clamping element 18 preferably is a clamping bracket or a clamp 18. The clamping element 18 has substantially a cuboidal shape and an eyelet 20 is provided on an upper side 19 of the clamping element 18. The second end section 12 of the clamping means 10 is passed through the eyelet 20 and is sewn to form a loop. A through hole 35 passes approximately centrally through the clamping element 18. A center axis 22 of the through hole 35 is approximately collinear with respect to a center axis 23 of the second fastening point 15 of the carrier device 31. Furthermore, the clamping element 18 can have a lug 24 that engages around the base section 9 of the battery 2 at least in sections and thus, for example, holds the battery 2 in position if the clamping means 10 is damaged.

The clamping arrangement 17 further has an actuating means 26 which preferably is a threaded screw 26. The actuating means 26 functions to set a prestress in the clamping means 10. A defined prestress is set in the clamping means 10 by actuating the actuating means 26 to move the clamping element 18 toward the carrier device 31. The prestress presses the battery 2 onto the carrier device 31 and fixes the battery 2 nonpositively on the carrier device 31. The actuating means 26 preferably has an engagement section 27 that is configured in a complementary manner to the mating engagement section 16 of the second fastening point 15 of the carrier device 31 and engages positively or nonpositively into the mating engagement section 16. A length of the clamping means 10 is dimensioned so that after the prestress is set in the clamping means 10, an end face 32 of the clamping element 18 is spaced apart from the carrier device 31 by a spacing a. For example, the clamping element 18 can be configured so that after the prestress is set in the clamping means 10, the end face 32 of the clamping element 18 is spaced apart from the carrier device 31 by a few millimeters.

To mount the fastening device 1 the battery 2 is placed on the carrier device 31. The clamping means 10 is guided at least in sections around the battery 2, and the actuating means 26 of the clamping arrangement 17 is brought into operative engagement with the second fastening point 15 of the carrier device 31. More particularly, the actuating means 26 is screwed, for example, into the second fastening point 15. The required prestress is set in the clamping means 10 by actuating the actuating means 26, for example, by screwing the actuating means into the second fastening point 15. The prestress is maintained by elastic material properties of the actuating means 26 and/or of the clamping means 10.

Figure 2:
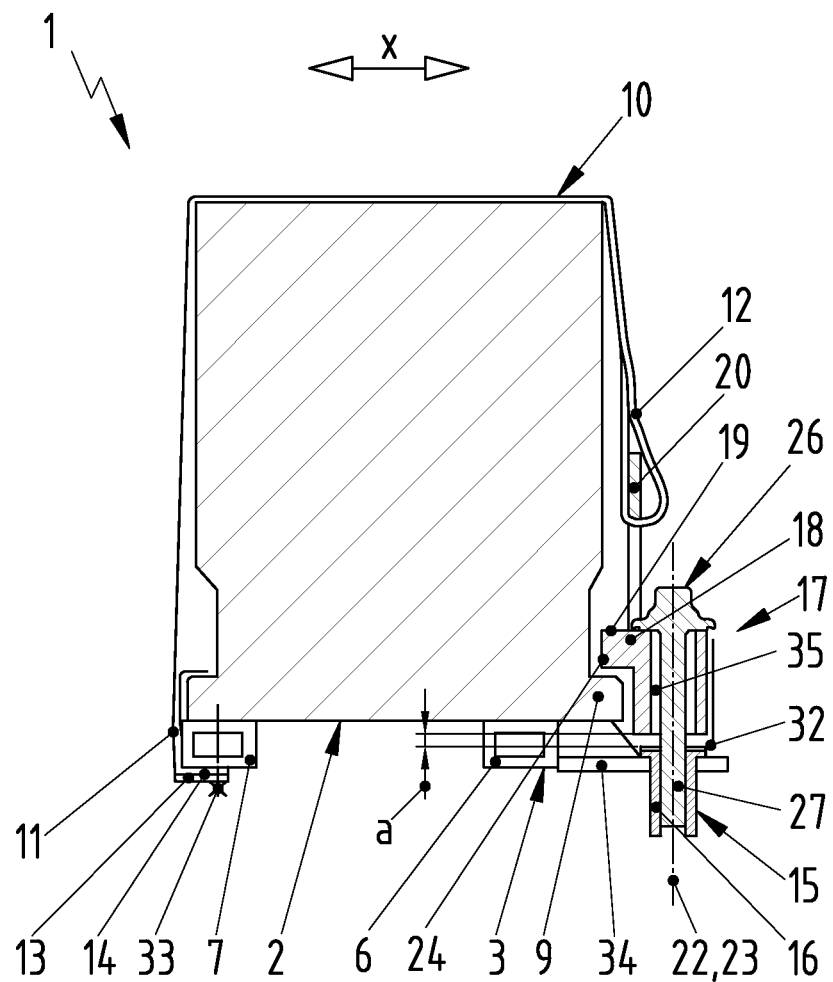
FIG. 2 is a sectional view of the preferred embodiment of the fastening apparatus according to FIG. 1.
Figure 3:
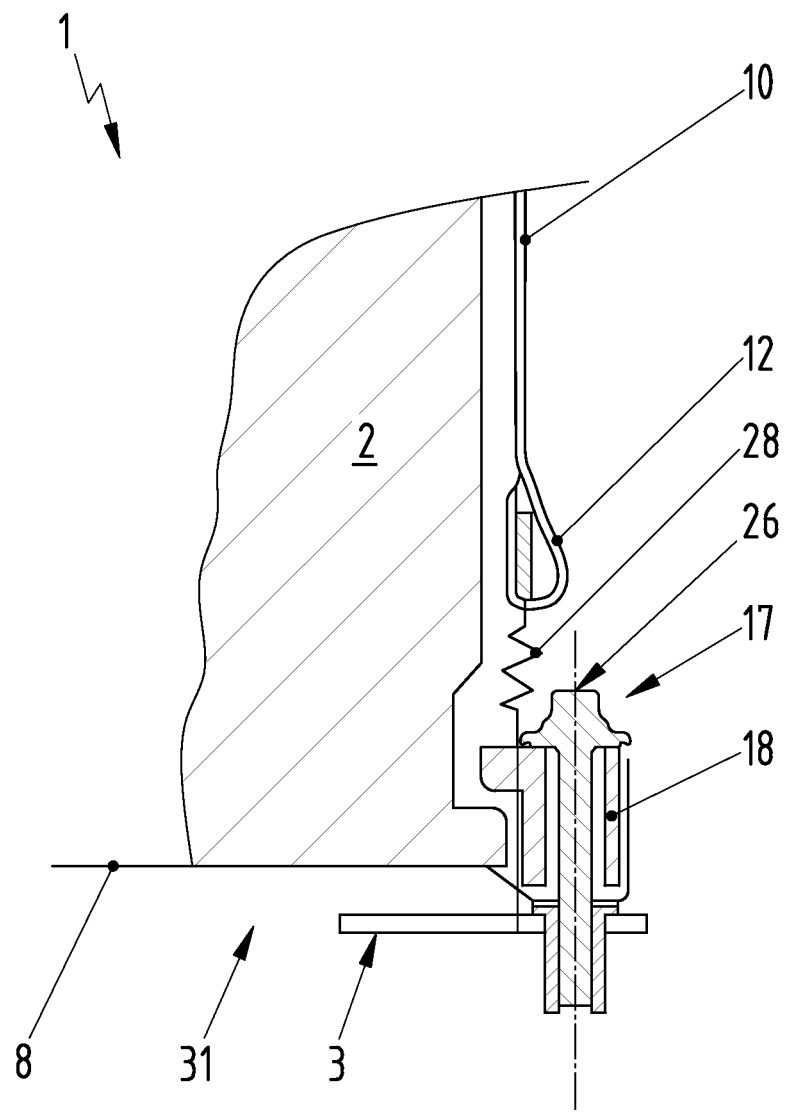
FIG. 3 is a partial sectional view of a further preferred embodiment of a fastening apparatus for a battery.

FIG. 3 illustrates a further embodiment of the fastening apparatus 1. This embodiment of the fastening apparatus 1 differs from the embodiment of the fastening apparatus 1 according to FIGS. 1 and 2 merely in the configuration of the clamping arrangement 17.

The clamping arrangement 17 preferably has a spring element 28 which additionally increases and/or maintains the prestress in the clamping means 10. The spring element 28 is arranged, for example, between the second end section 12 of the clamping means 10 and the clamping element 18. The spring element 28 can be prestressed by actuating the actuating means 26. A force transmission from the clamping element 18 to the clamping means 10 takes place via the spring element 28. The spring element 28 is configured, for example, as a spiral spring or an elastomeric spring. The spring element 28 compensates, for example, for embedding or a plastic deformation of the clamping means 10. As an alternative, for example, the spring element 28 can be an integral constituent part of the actuating means 26. Thus, for example, the spring element 28 can be a resiliently deformable screw shank of the actuating means 26.

Figure 4:
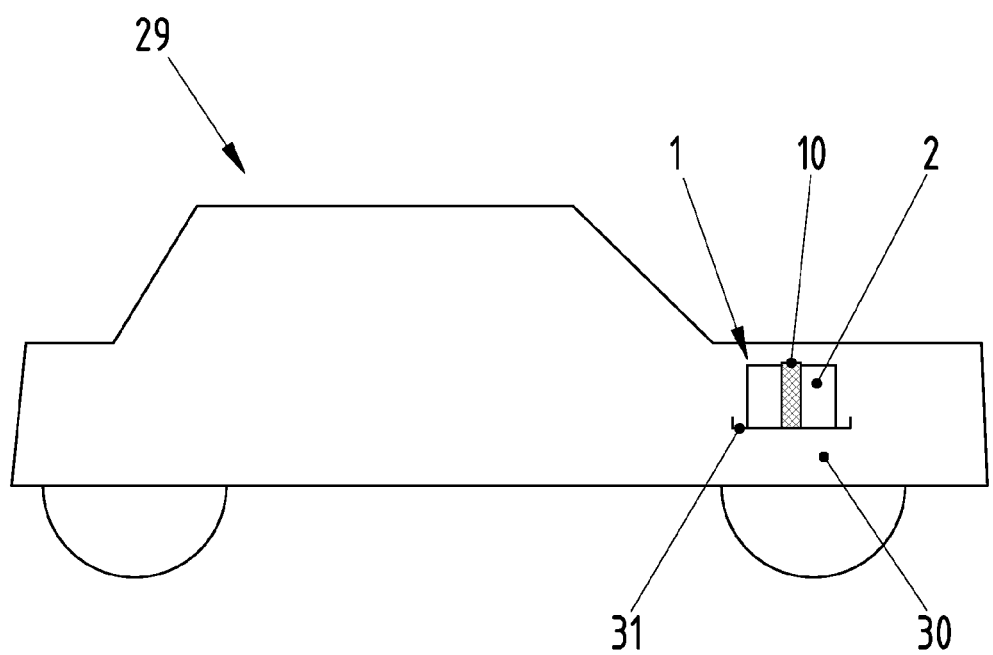
FIG. 4 is a motor vehicle having a fastening apparatus according to FIGS. 1 to 3.

FIG. 4 illustrates a motor vehicle 29 having the fastening apparatus 1 of FIGS. 1 to 3.

The fastening apparatus 1 with the battery 2 is arranged, for example, in an engine compartment 30 of the motor vehicle 29. The clamping means 10 encloses the battery 2 at least in sections and fixes the battery 2 nonpositively on the carrier device 31 for reliably protecting the battery 2 against slipping in the case of a crash of the motor vehicle 29. In addition, even in the case of damage to the battery 2, for example if the base section 9 breaks off or the battery 2 bursts, the battery 2 is held reliably by the fastening apparatus 1 so that individual parts of the battery 2 cannot fly around.

What is claimed is:

1. A fastening apparatus for a battery in a motor vehicle, the battery having a base section and opposite first and second sides extending from the base section, the base section including first and second recesses disposed respectively at the first and second sides of the battery comprising:
    a carrier device for carrying the battery, the carrier device having a first fastening point in proximity to the first side of the battery and a second fastening point in proximity to the second side of the battery, the first fastening point including an edge projecting up partly along the first side of the battery and into the first recess for holding the battery in proximity to the carrier device;
    a flexible clamping strap that encloses the battery at least in sections, the clamping strap having opposite first and second end sections, the first end section being fastened to a lower surface of the carrier device at the first fastening point;
    a clamping element having a coupling coupled to the second end section of the clamping strap, the clamping element including a lug projecting into the second recess for holding the battery in proximity to the carrier device and having a through hole opposed to the second fastening point of the carrier device, the through hole being disposed so that the coupling is between the lug and the through hole; and
    an actuating element passing through the through hole of the clamping element and disposed on a side of the coupling outward of the battery, the actuating element being adjustably engaged with the second fastening point for moving the clamping element toward the second fastening point and setting a prestress in the clamping strap between the first and second end sections and connecting the second end section of the clamping strap to the carrier device.

2. The fastening of claim 1, wherein the carrier device has a battery carrier with a framework structure.

3. The fastening of claim 2, wherein the carrier device has a battery shell for receiving the battery, the battery shell being arranged between the battery carrier and the battery.

4. The fastening apparatus of claim 3, wherein the battery shell is an integral constituent part of the battery carrier.

5. The fastening apparatus of claim 1, wherein the first end section of the clamping strap is screwed to the first fastening point of the carrier device.

6. The fastening apparatus of claim 1, wherein the clamping element is configured so that an end face of the clamping element is spaced from the carrier device after setting the prestress in the clamping strap.

7. The fastening apparatus of claim 1, wherein the second fastening point of the carrier device has a threaded hole, and the actuating element is a threaded screw passing through the through hole of the clamping element and engaged in the threaded hole of the second fastening point.

8. The fastening apparatus of claim 1, further comprising a spring element extending from the second end section of the clamping strap to the second fastening point of the carrier device for maintaining the settable prestress in the clamping element.

9. The fastening apparatus of claim 1, wherein the clamping strap is a flexible but substantially inextensible clamping strap formed from a high strength woven plastic fabric.

10. The fastening apparatus of claim 1, further comprising an eyelet or a belt end fitting sewn to the first end section of the clamping strap for fastening to the first fastening point of the carrier device.

11. A motor vehicle, comprising:
    a battery having a base section and opposite first and second sides extending from the base section, the base section including first and second recesses disposed respectively at the first and second sides of the battery; and
    a fastening apparatus including:
    a carrier device for carrying the battery, the carrier device having a first fastening point in proximity to the first side of the battery and a second fastening point in proximity to the second side of the battery, the first fastening point including an edge projecting up partly along the first side of the battery and into the first recess for holding the battery in proximity to the carrier device;
    a flexible clamping strap that encloses the battery at least in sections, the clamping strap having opposite first and second end sections, the first end section being fastened to a lower surface of the carrier device at the first fastening point;
    a clamping element having a coupling coupled to the second end section of the clamping strap, the clamping element including a lug projecting into the second recess for holding the battery in proximity to the carrier device and having a through hole opposed to the second fastening point of the carrier device, the through hole being disposed so that the coupling is between the lug and the through hole; and an actuating element passing through the through hole of the clamping element and disposed on a side of the coupling outward of the battery, the actuating element being adjustably engaged with the second fastening point for moving the clamping element toward the second fastening point and setting a prestress in the clamping strap between the first and second end sections and connecting the second end section of the clamping strap to the carrier device.

\* \* \* \* \*